United States Patent [19]

Lamort

[11] Patent Number: 5,407,538
[45] Date of Patent: Apr. 18, 1995

[54] DEVICE FOR SEPARATING A MIXTURE OF PAPER PULP AND CONTAMINANTS

[75] Inventor: Jean P. Lamort, Vitry Le Francois, France

[73] Assignee: E & M Lamort, Vitry Le Francois, France

[21] Appl. No.: 997,116

[22] Filed: Dec. 24, 1992

Related U.S. Application Data

[63] Continuation of Ser. No. 724,992, Jul. 2, 1991, abandoned.

[30] Foreign Application Priority Data

Jul. 2, 1990 [FR] France ............................ 90 08321

[51] Int. Cl.$^6$ ............................................. D21C 9/00
[52] U.S. Cl. .................................... 162/232; 162/55; 241/46.17
[58] Field of Search ............... 241/46.17, 69; 209/380, 209/271; 162/35, 251, 380, 232

[56] References Cited

U.S. PATENT DOCUMENTS

| | | | |
|---|---|---|---|
| 2,434,449 | 1/1948 | Wells | 241/46.17 |
| 2,954,174 | 9/1960 | Polleys | 366/314 |
| 3,432,107 | 3/1969 | Johnson | 241/46.17 |
| 3,525,477 | 8/1970 | Kobayashi | 241/74 |
| 3,836,464 | 9/1974 | Brookins et al. | 210/413 |
| 3,844,488 | 10/1974 | Neitzel | 241/46.17 |
| 3,854,667 | 12/1974 | Baehr et al. | 241/46.17 |
| 4,222,817 | 9/1980 | Clark | 241/46.17 |
| 4,443,296 | 4/1984 | Lamort | 162/4 |
| 4,480,796 | 11/1984 | Paraskevan | 241/46.17 |
| 4,604,193 | 8/1986 | Lamort | 209/273 |
| 4,818,339 | 4/1989 | Lamort | 241/46.17 |

FOREIGN PATENT DOCUMENTS 2346120  3/1975  Germany .................. 241/46.17

Primary Examiner—W. Gary Jones
Assistant Examiner—Brenda Lamb
Attorney, Agent, or Firm—Darby & Darby

[57] ABSTRACT

An apparatus for separating out the contaminants in a pulp slurry in which the housing of the separator is divided by a perforated screen into an inlet and an outlet section. The inlet section of the separator has a rotating blade mixing means to propel the liquid mixture in the pulp slurry away from the screen and toward the housing wall. The outlet section of the separator has a rotating blade cleaning means which is adjacent the downstream side of the screen for removing contaminants from the upstream side of the screen and moving the removed contaminants into the inlet chamber for further mixing and removal therefrom.

8 Claims, 2 Drawing Sheets

DEVICE FOR SEPARATING A MIXTURE OF PAPER PULP AND CONTAMINANTS

This is a continuation of application Ser. No. 07/724,992, filed Jul. 2, 1991, now abandoned.

BACKGROUND OF THE INVENTION

The present invention relates to a device used in used paper regeneration installations for the production of paper pulp.

As is known, the regeneration of used papers takes a more important place in the paper industry but it becomes more complex to carry out because of the proliferation of the contaminants such as sheets of plastic material, twines, pieces of glass etc.

This is why it has been proposed already, for example by EP-A-0 120 766, to use devices for separating a mixture of paper pulp and impurities removed at the bottom of the primary pulpers in which the used papers are shredded and mixed with water.

These widely used devices of known type are in the form of a generally closed revolving chamber having a substantially vertical wall provided with a perforated plate in front of which a blade member rotates.

Said chamber has an entrance situated opposite the perforated grid through which the mixture coming from the pulper is admitted, an outlet for the accepted pulp and another outlet for the contaminants.

The mixture filling the chamber is drawn by a pump situated behind the grid on screen, on the evacuation line of the paper pulp.

The blade member has as its only role to create a vacuum before the perforated grid with each passage of its blades so as to prevent the openings of the grid from becoming clogged by accumulations of impurities.

These devices although satisfactory, may present certain disadvantages in operation.

Thus, one may be confronted with the case of a contaminant of small cross section and of great length, for example a match, which becomes engaged in a perforation of the grid. In such a case, the vacuum created by the blade member before the grid does not suffice to extract the contaminant. On the contrary, the blades of the member may cut up the contaminant and thus create very small pieces which are then difficult to separate from the paper pulp.

Another problem that may occur has to do with the fact that the blade member being present solely for creating a vacuum for the cleaning of the grid, does not take along the liquid present in the chamber. The pulp is then set in motion only when it is near a blade and abruptly so; it is thus taken along by the blade when it comes up against the grid and is subjected to the suction of the pump. The different bodies present in the paper pulp are then subjected to a very strong acceleration which may produce fragmentation of contaminants.

OBJECTS OF THE INVENTION

It is the object of the present invention to propose a device which permits remedying these various shortcomings and obtaining a better separation of the paper pulp and of the impurities.

BRIEF DESCRIPTION OF THE INVENTION

To this effect, the invention relates to a device for separating a mixture of paper pulp and contaminants of the kind formed by a generally cylindrical chamber divided into two chambers by a wall having a calibrated grid, the contaminated paper pulp being admitted through an opening of the inlet chamber situated in the wall opposite the dividing wall, the cleaned paper pulp being evacuated through an outlet line discharging into the outlet chamber while the contaminants are removed through an outlet of the entrance chamber, characterized in that a mixing blade member is provided near the upstream surface of the dividing wall while a cleaning blade member is provided near the downstream surface of the dividing wall.

The device is further remarkable in that:
 the mixing blade member propels the liquid near its axis of rotation in opposite direction of the dividing wall and sucks it near its outer circumference,
 the wall of the inlet chamber opposite the dividing wall is arched and in that the opening admitting the contaminated paper pump is directed toward the axis of the mixing blade member,
 the cleaning blade member create a pressure on the downstream surface of the dividing wall,
 the blades of the cleaning blade member are straight and are in the form of a largely open dihedron,
 the mixing blade member and the cleaning blade member are mounted on a single shaft driven by a motor and traverse the dividing wall,
 the upstream face of the wall has stiffening bars or ribs,
 the bars extend radially from the shaft.

BRIEF DESCRIPTION OF THE DRAWINGS

The invention will be understood better and other characteristics and advantages thereof will become evident from the following description of an example of realization thereof with reference to the drawing in which.

DETAILED DESCRIPTION OF THE INVENTION

Figure 1:
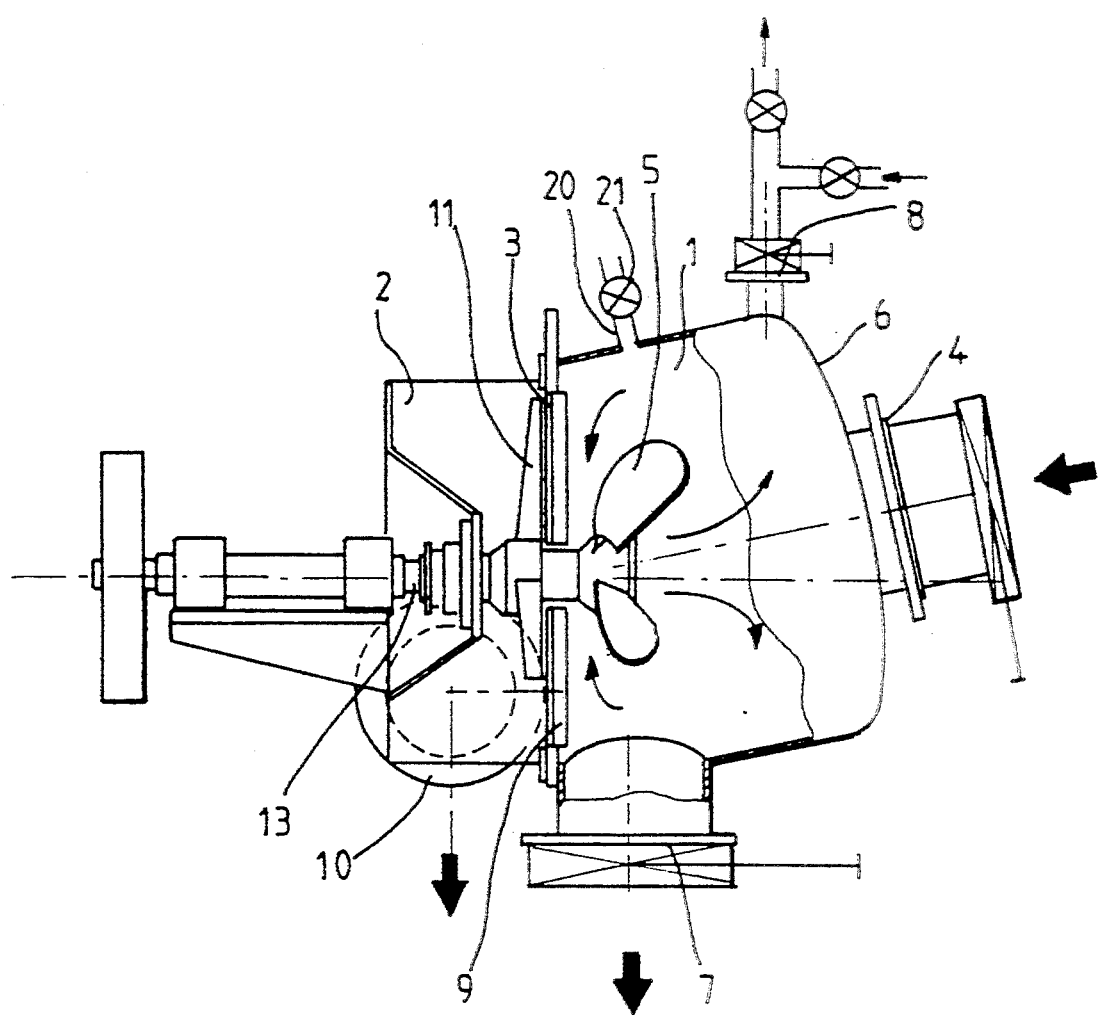
FIG. 1 is a view in partial section of the device according to the invention.

In FIG. 1 the device according to the invention is seen, it is formed of a generally cylindrical chamber divided into two parts 1, 2 by a wall 3 formed by a calibrated grid or screen. The paper pulp mixed with impurities is admitted into the inlet chamber 1 by the opening 4 connected to a pulper, not shown. In the chamber 1, near the upstream surface of the wall 3, a mixing member 5 which is preferably of the bladed type, like a propeller, has been provided which has the function, contrary to the known devices, of strongly mixing the pulp thereby permitting better separation of the paper fibers from the contaminants.

The mixing member 5 has blades of small dimension, and overall diameter, relatively capable of strongly mixing the pulp even if its speed of rotation is low. As the pulp is taken along at the speed of member 5, the risks of breakage upon passage of the blades are now eliminated.

Preferably, the mixing member 5 will be such that it propels the liquid toward the opposite wall 6 of chamber 1 near its axis of rotation and sucks it near its outer circumference. Thereby, on the one hand the heavy contaminants remain near the wall 6 and will not disturb the passage of the paper fibers through the grid 3 and on the other hand, the fibers arrive along an inclined direction near the grid where a slight vacuum prevails and are better drawn through the same.

If a mixing member propelling the pulp toward its outer circumference were used, the fibers would then be hurled against the grid 3 and would be driven parallel to it by a centrifugal movement instead of traversing it.

The chamber 1 is in a manner known in itself of slightly inclined axis relative to the horizontal in order to facilitate the removal of the contaminants through the outlet 7.

The wall 6 is arched, or curved so as to little disturb the movement of the pulp subjected to the mixing movement. The opening 4 through which the pulp to be separated is admitted, is provided in the axis of the chamber and directed toward the axis of the mixing 5 which interferes little with the movement of the pulp. The apparatus includes further a water inlet 20 controlled by a valve 21 and a compressed air supply and degasing line 8.

As is seen in FIG. 1, bars 9 are provided also on the upstream surface of the perforated grid 3 which is located in the chamber 1. These bars or ribs stiffen the perforated grid, which is subjected to very frequent and violent pressure variations, and to create turbulences in the movement of the pulp agitated by the screw 5. In fact, the pulp under the influence of the mixing member takes on a circular movement. It occurs as a circular laminar current in the vicinity of the walls, notably of the grid. The introduction of radial bars has the result of disturbing this current and creating turbulences favoring the agitation of the fibers in or by the members.

Into the chamber 2, which one might designate as outlet chamber 5, leads an outlet line 10 in which is arranged a pump in order to evacuate the paper pulp liberated of the contaminants.

Chamber 2 has according to the invention a cleaning member 11 whose blades rotate at a short distance from the downstream surface of the perforated screen 3. This cleaning member 11 is intended to create a pressure on the surface of the grid upon passage of its blades in order to push back into the chamber 1 the accumulations of fibers and the contaminants threatening to clog the grid perforations.

Thus, contrary to the known devices, the cleaning of the grid is assured by the creation of a pressure on the downstream side of the grid instead of creating a vacuum on the upstream side thereof.

This arrangement of two bladed members, one for mixing and the other for cleaning, permits to perform the separation of the paper pulp and of the contaminants in a very interesting manner.

The cleaning member 11 in no way threatens to cut up a contaminant wedged in the grid; its action by the creation of a pressure behind the grid is much more efficient than that of the bladed member placed in known manner on the upstream side of the grid.

Figure 2:
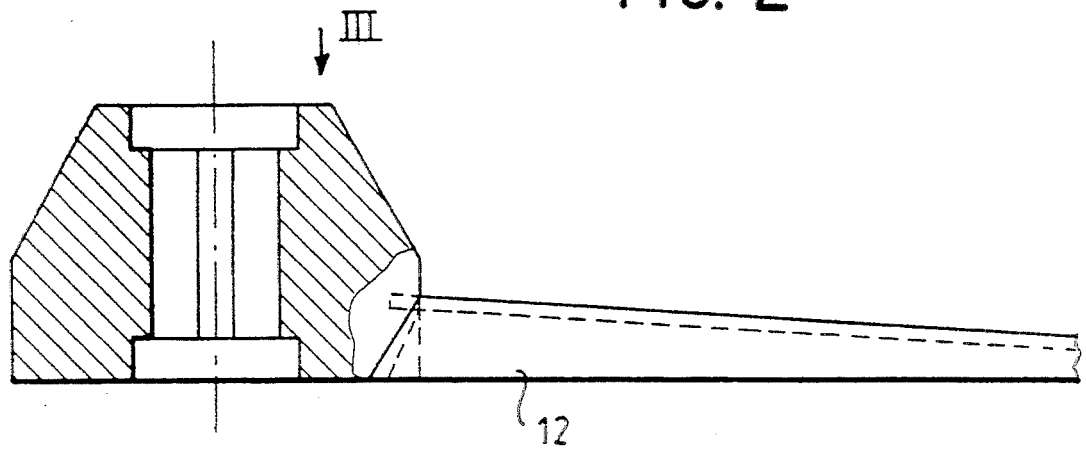
FIG. 2 is a partial view in section of the cleaning blade member.
Figure 3:
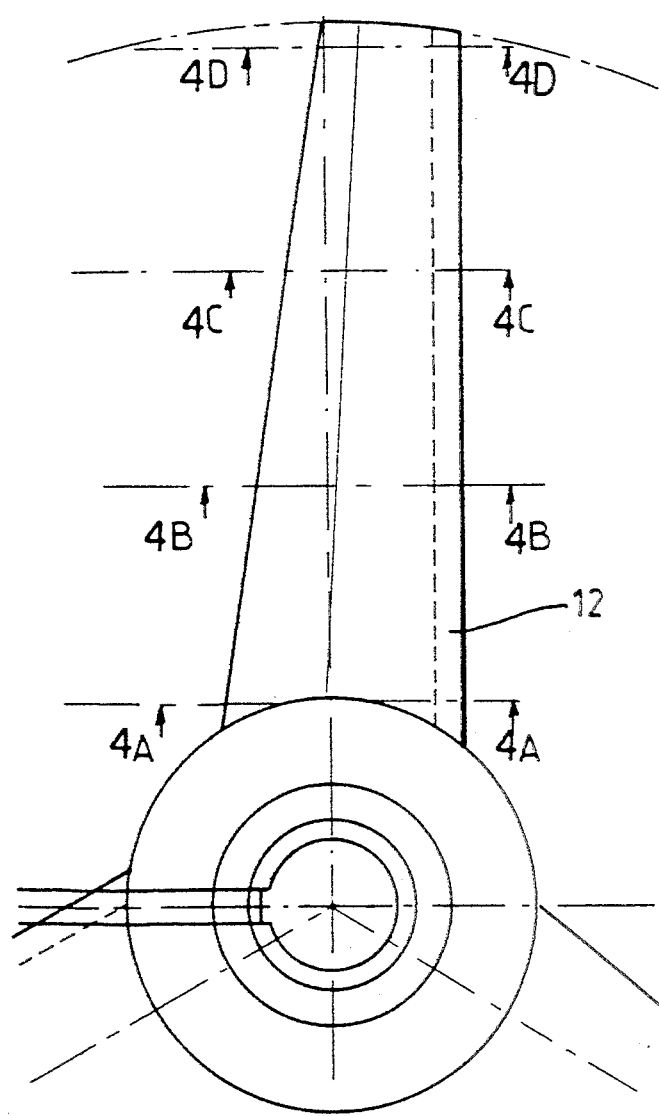
FIG. 3 is a view along arrow III of FIG. 2.
Figure 4D:
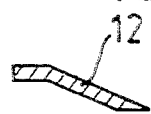
FIG. 4 represents the sections A—A, B—B, C—C, D—D of FIG. 3.
Figure 4C:
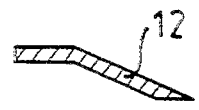
Figure 4B:
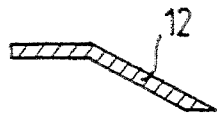
Figure 4A:
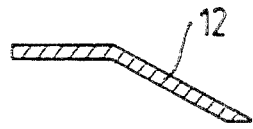

As FIGS. 2, 3 and 4 show, the cleaning member 11 is provided with generally straight blades 12 in order to prevent centrifuging the paper pulp having traversed the grid 3.

According to the invention the blades of the cleaning member present an upstream face inclined toward the grid 3. In transverse section the blade may present an arched or straight profile or also, as in the example of realization illustrated in FIG. 4, a profile of dihedral form. The inclination of the face oriented toward the grid is preferably radially variable in order to adapt the cleaning pressure to the linear velocity of the blade.

The cleaning member is disposed in immediate proximity of the grid; the edge of the blade on the side of the grid is at a very small distance from the surface of the grid in the order of a millimeter so as to prevent any escape and to produce a maximal effective counter-pressure.

As is seen in FIG. 1, the mixing member 5 and cleaning member 11 are mounted on a single shaft 13 which traverses the dividing walls of the two chambers 2 and 1. This shaft 13 is driven in rotation by any means not shown in the drawing.

In addition the device has on each inlet 4, 8 and outlet 7, 10 electrovalves permitting an operation similar to that known from emptying devices described in EP-A 0 120 766: one admits a mixture of paper pulp and contaminants through the opening 4, then one admits water at 8 in proportion as paper pulp is removed through the outlet 10. The admission of water is stopped when the paper fiber content of the issuing pulp becomes less than a predetermined value for which it is considered that the contaminants are washed from all fiber.

After having emptied the device of the diluted pulp, one opens the outlet 7 in order to eliminate the contaminants.

The operation of the mixing member 5 on the upstream side of the perforated wall 3 permits to assure a good separation of the fibers and of the contaminants, while the cleaning member 11 located on the downstream side unclogs the perforated wall without risking either to cut up a contaminant wedged in a perforation, or to break up a contaminant subjected to too violent an acceleration as this member is located in cleaned paper pulp.

I claim:

1. Apparatus for separating contaminants from a liquid mixture of paper pulp with contaminants comprising:

a housing with a chamber, a perforated screen in said housing dividing the chamber into inlet and outlet sections to block the passage of contaminants from the inlet to the outlet sections and through which the paper pulp passes from the inlet to the outlet section free of contaminants, means spaced from said screen for admitting the paper pulp and contaminants liquid mixture into said chamber inlet section, rotating mixing means in said chamber inlet section on the upstream side of said screen, said mixing means including a shaft extending through said screen having a plurality of blades extending from said shaft and flared outwardly and toward the housing wall opposing the screen and leaving a space between said blades and the screen for free flow therebetween of the liquid mixture and to propel the liquid mixture in the inlet section away from the screen toward the housing wall opposing said screen and counter to the flow of the liquid mixture admitted from said means for admitting the liquid mixture for further mixing with additional said liquid mixture admitted into said inlet section and for flowing the liquid mixture between the blades of said mixing means and said screen and across the inlet section side of the screen with the paper pulp passing through the screen openings to the chamber outlet section and contaminants being blocked, rotating blade cleaning means in said outlet section adjacent the downstream side of said screen to create a pressure acting through the screen upstream for removing contaminants from the upstream side of said screen and to move said removed contaminants upstream in the inlet chamber section for further mixing with the liquid mixture in the chamber inlet section and removal therefrom, means at said chamber outlet section downstream of said screen for removing the separated cleaned paper pulp, and means at said chamber inlet section upstream of said screen through which the separated contaminants are removed.

2. Apparatus as in claim 1 wherein said means for admitting the liquid mixture is located on said housing wall opposing said screen and directs the pulp toward the rotating mixing means.

3. Apparatus as in claim 2 wherein the housing wall opposing the screen is curved.

4. Apparatus as in claim 1 wherein the cleaning means has at least one blade with an straight face inclined toward the screen.

5. Apparatus as in claim 4 wherein said at least one blade of said cleaning means has the shape of an open dihedron.

6. Apparatus as in claim 1 further comprising stiffening bars on the upstream side of said screen.

7. Apparatus as in claim 1 wherein said means for admitting the liquid mixture is substantially above the shaft of the mixing means.

8. Apparatus as in claim 7 wherein said means for removing the contaminants is at the bottom of said housing and below said means for admitting the liquid mixture.

* * * * *